April 29, 1958     A. W. VERGEER     2,832,176
DISPLAY DEVICES
Filed Jan. 28, 1955     2 Sheets-Sheet 1

INVENTOR.
ALBERT W. VERGEER
BY
*Henry L. Burkitt*
ATTORNEY

April 29, 1958 A. W. VERGEER 2,832,176
DISPLAY DEVICES
Filed Jan. 28, 1955 2 Sheets-Sheet 2
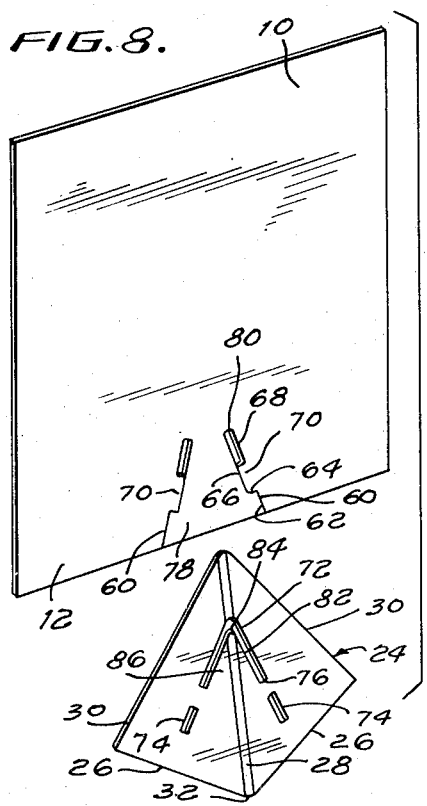
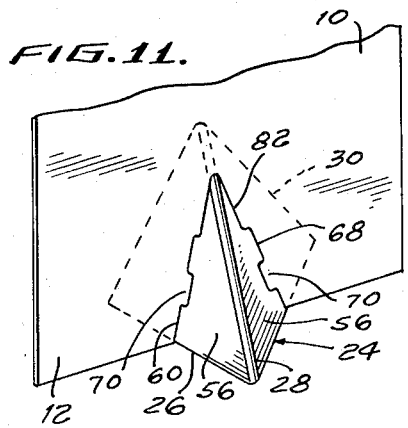
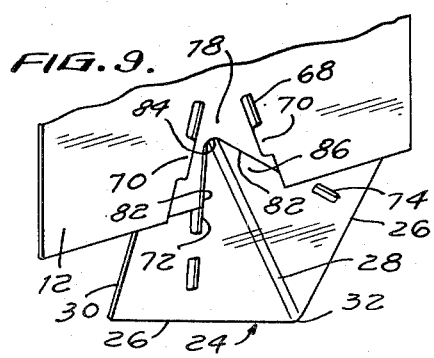
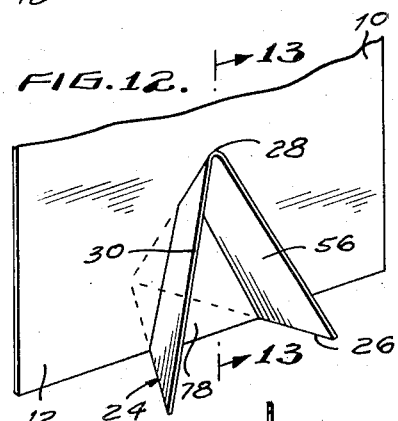
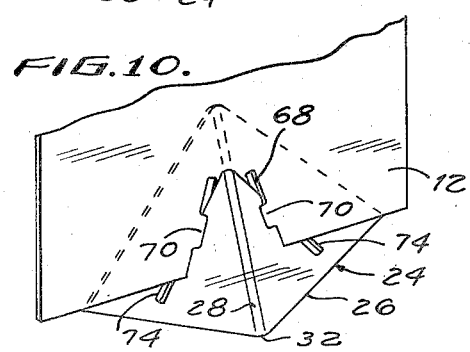
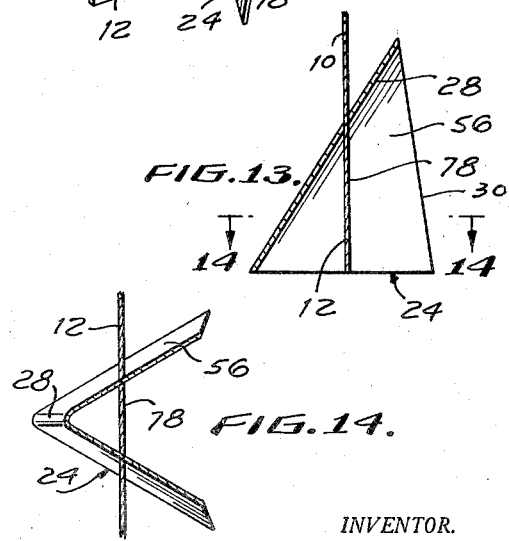
INVENTOR.
ALBERT W. VERGEER
BY Henry L. Burkitt
ATTORNEY พ2,832,176
Patented Apr. 29, 1958

United States Patent Office

2,832,176
DISPLAY DEVICES

Albert William Vergeer, Ozone Park, N. Y., assignor to The Meehan-Tooker Co., Inc., New York, N. Y., a corporation of New York Application January 28, 1955, Serial No. 484,794

10 Claims. (Cl. 40—124.1)

This invention relates to display devices.

It is customary, in connection with devices such as those used for displays on counters, in windows, and in other associations, to provide some type of support, which in many cases has the effect of an easel. This term has become a general name for the type of display devices which are "self-supported" by a member carried upon the display device. In many cases, the so-called easel is retained, by means of adhesives of various types, in association with display material so that it may be moved into position to serve as a footing. Various folding arrangements have been devised so that such footings may be folded into collapsed association with the member bearing the advertising matter, or be extended at will. However, in most cases, once the footing has been extended into position by bending along score lines provided for that purpose, the footing resists attempts to return to its collapsed condition.

It is an object of the invention to eliminate difficulties resident in many footings for standing displays by providing a footing which is not adhesively secured to the display device to be supported, but is retained in association with the display device so that the whole assembly may be stored substantially flat for transportation, and then be manipulated into position for use by a very simple operation, and, thereafter, when the structure is desired to be stored away, the entire arrangement may again be collapsed almost instantly, with the footing assuming its initially flat condition to permit storage without difficulty.

Other objects of the invention will be set forth hereinafter, or will be apparent from the description and the drawings, in which are illustrated embodiments exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which are disclosed such practical constructions, Fig. 1 is an exploded perspective view of a panel or other means for bearing advertising matter, and a footing member to be associated with the panel for supporting it in an upright position, the panel and the footing member being shown separated;

Fig. 8 is a view similar to Fig. 1, but of a modified form of interlocking structure for panel and footing member;

Figs. 9 and 10 are views similar to Figs. 2 and 3, respectively, but of the structures of Fig. 8, showing the manner in which the parts may be manipulated into position so that they may readily be stored;

Figure 4:
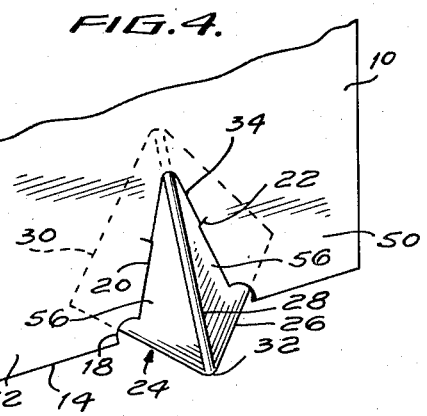
Fig. 4 is a view similar to Fig. 3, showing the position of the footing member and panel as they are moved relatively to each other to set them for functioning as an upright display, the footing member having become slightly distorted or folded, and having assumed a three-dimensional aspect to function as a support for the panel.
Figure 5:
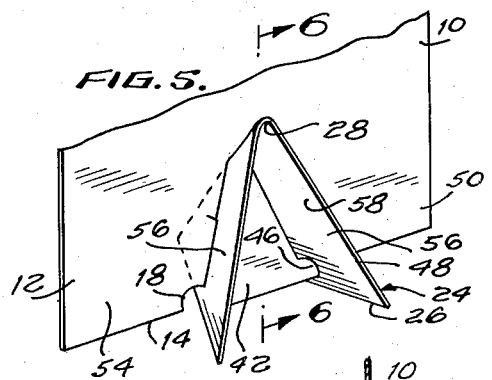
Fig. 5 is a perspective view of the parts in the association of Fig. 4, as they appear when viewed from the side of the panel opposite to that depicted in Fig. 4.

Figs. 11 and 12 are views similar to Figs. 4 and 5, respectively, but of the structure as shown in Figs. 8, 9 and 10, the views showing the relationship of the parts when they are arranged for supporting the panel in an upright position;

Fig. 13 is a vertical cross-sectional view, substantially on the line 13—13 of Fig. 12; and Fig. 14 is a transverse cross-sectional view, substantially on the line 14—14 of Fig. 13.

Figure 1:
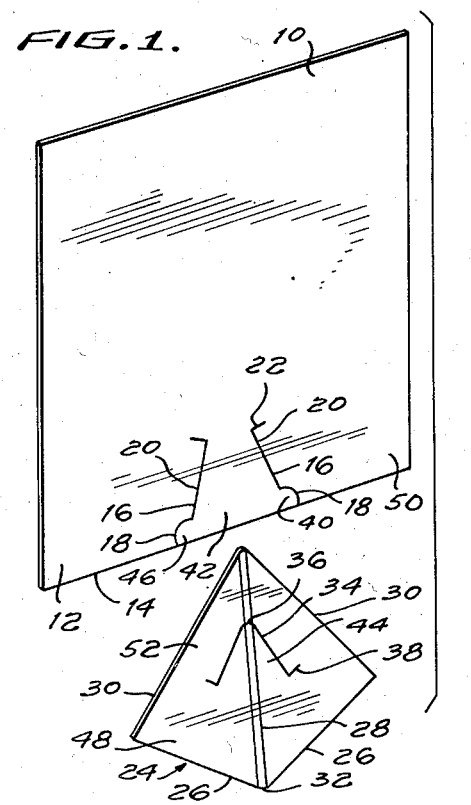

Sheet 10, as shown in Fig. 1, is intended to represent a member upon which is to be arranged material such as advertising matter, or similar items, as, for instance, by attaching thereto or imprinting thereon devices or printed matter. Thus, whatever may be the material associated with a member depicted by sheet 10, that member will include or have associated therewith a portion 12 as its lowermost extremity, and portion 12 preferably has characteristics similar to those of paper board imparted thereto. Thus, portion 12 has an edge 14, from which a pair of cuts 16, formed in the body of portion 12, extend convergently upwardly. Cuts 16 may include portions 18 which may be rounded and even arcuate; from portions 18 extend converging slits 20. Slits 20 do not intersect, but terminate in prong slits 22, which extend laterally away from the ends of slits 20 at sharp angles.

To be associated with portion 12 is provided a separable footing member 24. Member 24 may have a pair of edges 26 which diverge from a center score 28; between edges 26 an obtuse angle may be formed. Central score 28 is made broad enough so that a definite degree of thickness or body is imparted thereto. Member 24 may terminate at edges 30, which may be of any desired contour, or extent, or both, so long as edges 26 are of an extent sufficient so that member 24 will provide the support desired therefrom. Central score 28 may be substantially the bisector of the angle between edges 26.

Spaced upwardly along score 28 from the meeting point 32 of edges 26, member 24 may be cut to provide a pair of slits 34, meeting at and diverging from a rounded slit 36. The angle between slits 34 is larger than the angle between cuts 16. Each slit 34 may terminate in a prong slit 38 which extend at a sharp angle, substantially perpendicularly, to its slit 34.

Figure 2:
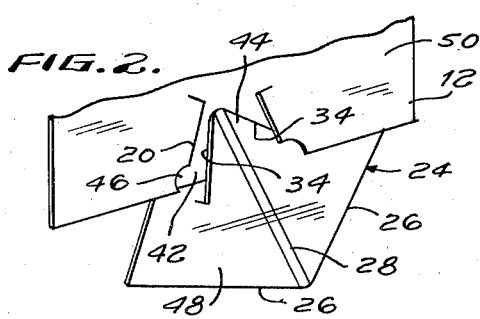
Fig. 2 is a detail perspective view, showing a movement of the parts in effecting association of the footing member with the panel.
Figure 6:
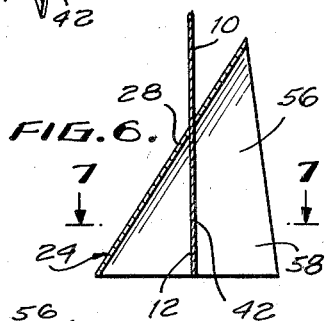
Fig. 6 is a vertical cross-sectional view, substantially on the line 6—6 of Fig. 5.
Figure 3:
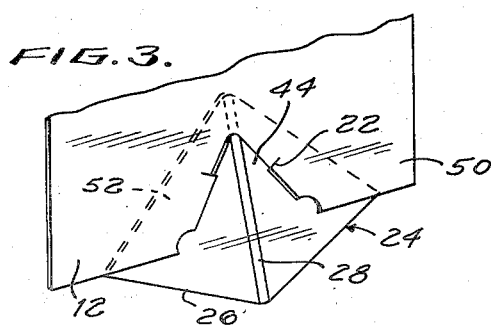
Fig. 3 is a view similar to Fig. 2, showing the footing member and the panel member in the relationship they finally assume when they are positioned for storage purposes.
Figure 7:
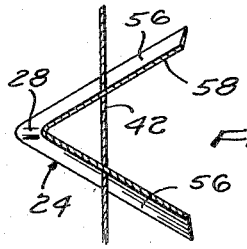
Fig. 7 is a transverse cross-sectional view, substantially on the line 7—7 of Fig. 6.

Member 24 may be assembled with portion 12 by inserting an ear 40 formed by a rounded portion 18 (Fig. 2) into one of slits 34 so that flap 42, defined by slits 20, will move to one side of tab 44 of member 24. Ear 40 moves beyond the opening provided by slit 34, while member 24 may be cocked sidewise, so that this movement of ear 40 past tab 44 may be facilitated. Finally the other ear 46 clears the other slit 34, at which time flap 42 will have been moved wholly to contact that side of tab 44 opposed to the front face 48 of member 24. Prong slits 22 (Fig. 3) permit flap 42 to pivot, so that tab 44 may slide on outside face 50 of portion 12. The part 52 of member 24 beyond slits 34 will now be disposed against the inside face 54 of portion 12. Now all of the parts are substantially completely flat (Fig. 3) so that the assembly now complete may be stored easily.

If pressure is now applied to point 32 (Fig. 4), member 24 including tab 44 will tend to fold on score 28 as the slits and cuts wedge against each other. This force is effective positively as flap 42 engages within slits 34, and as tab 44 engages against the flap. This action may be facilitated by applying direct pressure against the walls 56 which are to be formed, although it is possible to effect this movement of walls 56 toward each other merely by continuing pressure against point 32 (Figs. 4 and 5) until the final shape results. As this is occurring, ears 40 and 46 are being forced tightly against faces 58 of member 24, more firmly to clamp the flap and footing member 24 together. Thus a firm support for portion 12 and the parts carried thereby is erected.

Score line 28 is sufficiently heavy so as to permit return of footing member 24 to its flat condition in the event it is desired to collapse the entire device. For that purpose, it is necessary merely to pull against point 32, whereupon member 24 will collapse into the flattened state of Fig. 3. Prong slits 38 facilitate the movement of tab 44 with relation to member 24 in the several operations.

In Figs. 8 to 14, a modified construction is shown, in which portion 12 is provided with slits 60 having a form different from slits 20. Slits 60 may have a straight line form 62 to angle 64, at which slit 60 is displaced into another straight line portion 66. At the upper portion of slit 60, an open section may be provided to form a slot 68. Thus there is formed a prong, tab or ear 70.

Member 24, in the structure of Figs. 8 to 14, may have edges 26, side edges 30 and a central score 28 disposed in substantially the same relationship as in Fig. 1. In place of slits 34, a set of slots may be substituted. For this purpose, in one case, an inverted V-slot 72 is provided, the apex of the V being on score 28. A pair of short slots 74 are spaced from ends 76 of slot 72. The assembly, in Figs. 9 and 10, of member 24 with portion 12 is effected in substantially the same manner as in Figs. 2 and 3, with the exception that no ears 40 and 46 are involved. Flap 78 on portion 12, pivoting by the effect of slots 68, opens away from portion 12. The flap is inserted into slot 72 (Fig. 9), and member 24 is moved into position in substantially the same manner as in Fig. 2. The terminal edges 80 of slots 68 finally are engaged by side edges 82 of slot 72, which forms apex 84. Flap 78 is now behind tab 86 and apex 84.

Now, when pressure is applied to point 32 (Fig. 10), the same forces act upon member 24 as in the construction of Fig. 4. Walls 56 tend to move toward each other, score 28 functioning as a pivot. Member 24 finally assumes the position of Figs. 11 and 12. At this time, ears 70 have been moved into position to lock into slots 74 (Fig. 11). Thus, the footing member is locked firmly to portion 12, and may not be separated except by a sharp force. Such a force may be obtained by pulling on point 32, or by manipulating the entire member 24, when it is desired to collapse the structure into condition for housing or shipment.

Many other changes could be effected in the particular constructions, and in the methods of use and construction, and in specific details thereof, hereinbefore set forth, without substantially departing from the invention intended to be defined herein, the specific description being merely of embodiments capable of illustrating certain principles of the invention.

What is claimed as new and useful is:

1. A device for advertising display or like purposes, comprising a member adapted to have display matter associated therewith, said member having a relatively stiff flat bottom portion, said portion having a pair of cuts extending inwardly toward each other from the bottom edge thereof to define a flap, a relatively flat support section of material substantially of the same rigidity as said bottom portion, the section having a pair of edges diverging at a relatively large angle from a meeting point, the section having a pair of cuts extending toward said section edges from an apex, the section being foldable along a line through said apex and the meeting point of said pair of edges, said apex and said flap being displaceable laterally so that they may straddle each other when the cuts are interengaged, the section being forced to fold upon said line by movement of the cuts one upon the other and upon applying force against said meeting point to bring said pair of edges substantially into the same plane as said portion bottom edge.

2. In combination with a display device having a relatively flat relatively stiff member for disposing display material in position for visualization, at least one edge of the member forming a straight line, a normally planar support section, the support section and the member at said edge having slit means for interfitting engagement, the interfittingly engaged section and member being movable with relation to each other, the interfitting slit means cooperating on movement of the section upon the member to cause the section to fold along a line to position edges of the section to cooperate with said member edge to produce a stable support for maintaining the member substantially upright.

3. A device for advertising display or like purposes, comprising a member adapted to have display matter associated therewith, said member having a relatively stiff flat bottom portion, said portion having a pair of slits extending inwardly toward each other from the bottom thereof to define a flap, a relatively flat foldable section of material substantially of the same rigidity as said bottom portion, the section having a pair of edges diverging at a relatively large angle from a meeting point, the section having a pair of slits extending from an apex toward but terminating short of said section edges, the section being foldable along a line through said apex and said meeting point, said apex and said flap being displaceable laterally so that they may straddle each other when the slits are interengaged, the section being forced to fold upon said line by movement of the slits one upon the other upon applying force against said meeting point to bring said pair of edges substantially into the same plane as said portion bottom edge.

4. A device for advertising display or like purposes, comprising a member adapted to have display matter associated therewith, said member having a relatively stiff flat bottom portion, said portion having a pair of slits extending inwardly toward each other from the bottom edge thereof to define a flap, a relatively flat foldable section of material substantially of the same rigidity as said bottom portion, the section having a pair of edges diverging at a relatively large angle from a meeting point, the section having a pair of slits extending from an apex toward but terminating short of said section edges, the section being foldable along a line through said apex and said meeting point, said apex and said flap being displaceable laterally so that the section may be folded and with the flap assume a pyramidal shape as the slits are interengaged, the section being forced to fold upon said line by movement of the slits one upon the other upon applying force against said meeting point to bring said pair of edges substantially into the same plane as said portion bottom edge.

5. A device for advertising display or like purposes, comprising a member adapted to have display matter associated therewith, said member having a relatively staff flat bottom portion, said portion having a pair of slits extending inwardly toward each other from the bottom edge thereof to define a flap, at least a portion of a slit being non-rectilinear, a relatively flat support section of material substantially of the same rigidity as said bottom portion, the section having a pair of edges diverging from a meeting point at a substantially obtuse angle, the section having a pair of slits extending toward said section edges from an apex, the section being foldable along a line through said apex and said meeting point, said apex and said flap being displaceable laterally so that they may straddle each other when the slits are interengaged, the section being forced to fold upon said line by movement of the slits one upon the other upon applying force against said meeting point to bring said pair of edges substantially into the same plane as said portion bottom edge, and the portion of the flap bounded by the non-rectilinear portion of the slit engaging against faces of the folded section to brace the member with relation to the section.

6. A device for advertising display or like purposes, comprising a member adapted to have display matter associated therewith, said member having a relatively stiff flat bottom portion, said portion having a pair of slits extending inwardly toward each other from the bottom edge thereof to define a flap, at least a portion of a slit being non-rectilinear, a relatively flat support section of material substantially of the same rigidity as said bottom portion, the section having a pair of edges diverging from a meeting point at a substantially obtuse angle, the section having a pair of slits extending from an apex toward said section edges, said apex and said flap being displaceable laterally so that they may straddle each other when the slits are interengaged, the section being foldable as the slits interengage, and the portion of the flap bounded by the non-rectilinear portion of the slit engaging against faces of the folded section to brace the member with relation to the section.

7. A device for advertising display or like purposes, comprising a member adapted to have display matter associated therewith, said member having a relatively stiff flat bottom portion, said portion having a pair of slits extending inwardly toward each other from the bottom edge thereof to define a flap, at least a portion of each slit being non-rectilinear, a relatively flat support section of material substantially of the same rigidity as said bottom portion, the section having a pair of edges diverging from a meeting point at a substantially obtuse angle, the section having a pair of slits extending toward said section edges from an apex, the section being foldable along a line through said apex and said meeting point, said apex and said flap being displaceable laterally so that they may straddle each other when the slits are interengaged, the section being forced to fold upon said line by movement of the slits one upon the other upon applying force against said meeting point to bring said pair of edges substantially into the same plane as said portion bottom edge, and the portion of the flap bounded by the non-rectilinear portions of the slits engaging against faces of the folded section to brace the member with relation to the section.

8. A device for advertising display or like purposes, comprising a member adapted to have display matter associated therewith, said member having a relatively stiff flat bottom portion, said portion having a pair of slits extending inwardly toward each other from the bottom edge thereof to define a flap, a portion of each slit being shaped to form an ear on the flap adjacent its free edge, a relatively flat support section of material substantially of the same rigidity as said bottom portion, the section having a pair of edges diverging at a substantially obtuse angle from a meeting point, the section having a pair of slits extending toward said section edges from an apex, the section being foldable, said apex and said flap being displaceable laterally to force the section to fold and with the flap to assume a pyramidal shape as the slits are moved relatively to each other to interengage, the movement of the slits one upon the other resulting in such folding of the section until said section edges are moved into substantially the same plane as said edge of the member, and the ears engaging against faces of the folded section to brace the member with relation to the section.

9. A device for advertising display or like purposes, comprising a member adapted to have display matter associated therewith, said member having a relatively stiff flat bottom portion, said portion having a pair of slits extending inwardly toward each other from the bottom edge thereof to define a flap, a portion of each slit being shaped to form an ear on the flap adjacent its free edge, a relatively flat support section of material substantially of the same rigidity as said bottom portion, the section having a pair of edges diverging at a substantially obtuse angle from a meeting point, the section having a pair of slits extending from an apex toward but terminating short of said section edges, a prong slit diverging away from the terminal end of each divergent slit, the section being foldable, said apex and said flap being displaceable laterally to force the section to fold and with the flap to assume a pyramidal shape as the slits are moved relatively to each other to interengage, the movement of the slits one upon the other resulting in such folding of the section until said section edges are moved into substantially the same plane as said edge of the member, and the ears engaging against faces of the folded section to brace the member with relation to the section, the prong slits providing means for passage of the ears for interengagement of the section with the member.

10. A device for advertising display or like purposes, comprising a member adapted to have display matter associated therewith, said member having a relatively stiff flat bottom portion, said portion having a pair of slits extending convergently toward each other from the bottom edge thereof but terminating short of each other, prong slits extending angularly away from each other at the termini of the convergent slits to define a flap, a portion of each slit being shaped to form an ear on the flap adjacent its free edge, a relatively flat support section of material substantially of the same rigidity as said bottom portion, the section having a pair of edges diverging at a substantially obtuse angle from a meeting point, the section having a pair of slits extending from an apex toward but terminating short of said section edges, a prong slit diverging away from the terminal end of each divergent slit, the section being foldable, said apex and said flap being displaceable laterally to force the section to fold and with the flap to assume a pyramidal shape as the slits are moved relatively to each other to interengage, the movement of the slits one upon the other resulting in such folding of the section until said section edges are moved into substantially the same plane as the said edge of the member, and the ears engaging against faces of the folded section to brace the member with relation to the section, the prong slits providing means for passage of the ears for interengagement of the section with the member.

References Cited in the file of this patent

UNITED STATES PATENTS

| | | |
|---|---|---|
| 732,828 | Christopher | July 7, 1903 |
| 1,343,054 | Hurlbut | June 8, 1920 |
| 1,557,332 | Robbins | Oct. 13, 1925 |
| 1,768,675 | Egan | July 1, 1930 |
| 2,472,166 | Mathewson | June 7, 1949 |

FOREIGN PATENTS

| | | |
|---|---|---|
| 349,717 | Great Britain | June 4, 1931 |
| 113,136 | Sweden | Feb. 6, 1945 |